United States Patent [19]

McWilliams

[11] 3,863,736
[45] Feb. 4, 1975

[54] HELICOPTER-MOUNTABLE LANDING PLATFORM AND WORK SCAFFOLD AND METHOD OF PLACING SAME IN OPERATING POSITION

[75] Inventor: Roy J. McWilliams, Pomona, N.Y.

[73] Assignee: Decair Helicopters, Inc., Spring Valley, N.Y.

[22] Filed: May 31, 1973

[21] Appl. No.: 365,713

[52] U.S. Cl................ 182/150, 182/142, 182/187, 244/137 R
[51] Int. Cl.............................................. E04g 3/08
[58] Field of Search........... 182/150, 132, 141, 145, 182/187, 222, 129; 244/137 R

[56] References Cited
UNITED STATES PATENTS

| | | | |
|---|---|---|---|
| 1,926,207 | 9/1933 | McAlpine | 182/150 |
| 3,159,243 | 12/1964 | Leonard | 182/150 |
| 3,176,795 | 4/1965 | Taylor | 182/145 |
| 3,393,769 | 7/1968 | Springer | 182/150 |

FOREIGN PATENTS OR APPLICATIONS

| | | | |
|---|---|---|---|
| 788,299 | 12/1957 | Great Britain | 182/150 |

*Primary Examiner*—Reinaldo P. Machado
*Attorney, Agent, or Firm*—Darby & Darby

[57] ABSTRACT

A work scaffold adapted to be mounted on a utility pole by a helicopter and having a landing platform to permit a workman to disembark from a hovering helicopter. The mounting and removal of the landing platform and work scaffold from the utility pole is aided by a latch-equipped lift hook suspended from the helicopter and a pair of maneuvering poles maniuplated by helicopter crewmen.

11 Claims, 4 Drawing Figures

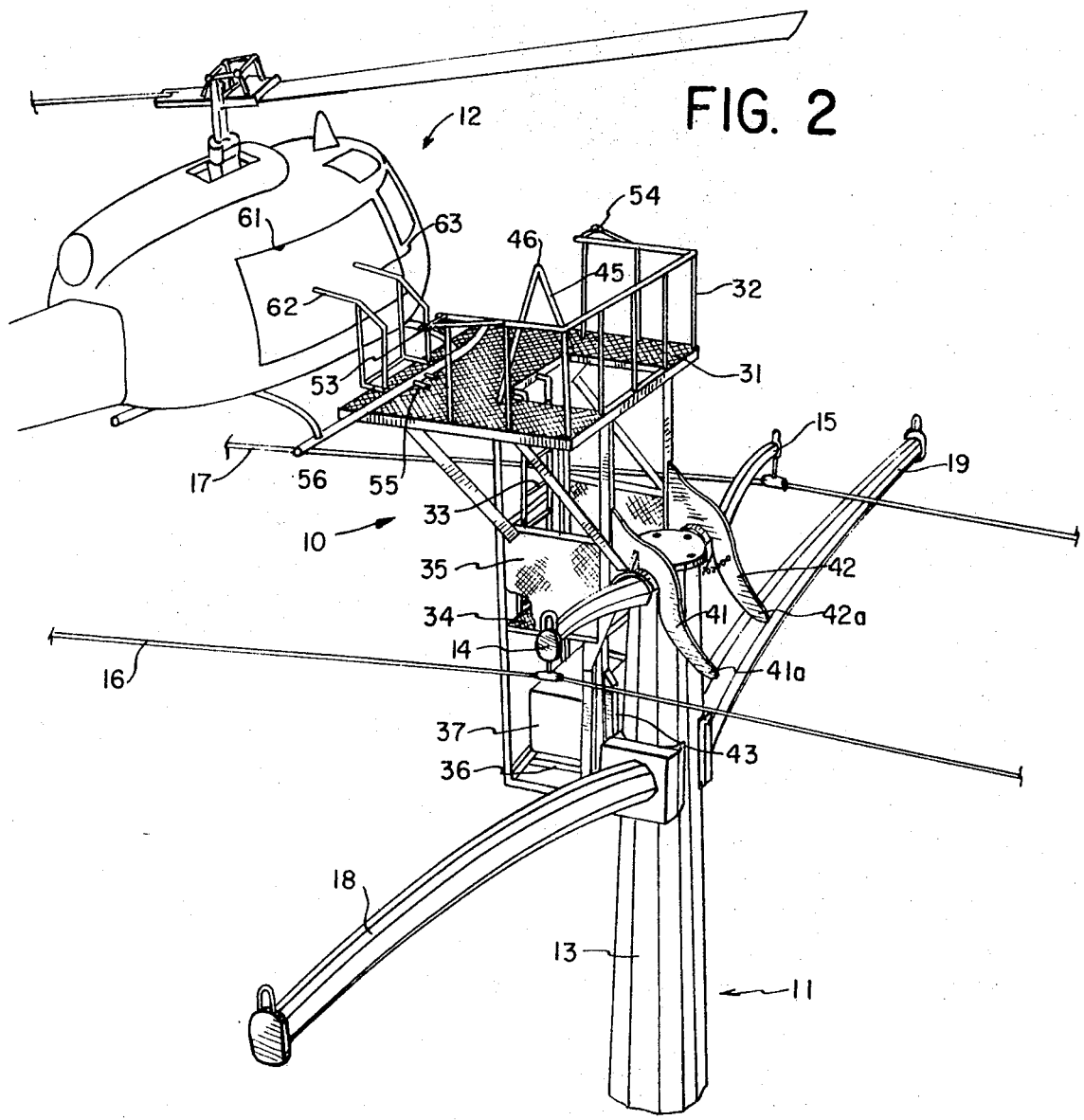

HELICOPTER-MOUNTABLE LANDING PLATFORM AND WORK SCAFFOLD AND METHOD OF PLACING SAME IN OPERATING POSITION

This invention relates to work scaffolds for utility poles such as power transmission poles and, more particularly, to a helicopter-transportable and positionable work scaffold for power transmission poles located in terrain where it is impractical or undesirable to use ground vehicle for access to the poles.

Electrical power transmission lines often traverse many miles of rough terrain which is relatively inaccesible to ground vehicles. Such terrain presents a problem of getting maintenance crews and equipment to a trouble-spot when repairs are needed. This problem is aggravated when repairs must be made quickly in order to restore the transmission line to service.

A similar problem is encountered in the case of electrical power transmission lines which traverse park lands which are required to be preserved in a condition approximating their natural state. In such situations the access roads used during the construction of the transmission line are often eliminated thereafter, being redressed and reseeded as part of the effort to restore the landscape of the right-of-way to something resembling its original condition. The use of heavy ground vehicles to transport the maintenance crews and equipment to the trouble-spots would result in unnecessary scarring of the restored right-of-way.

It is therefore an object of the present invention to provide a method and apparatus enabling the repair of utility poles in terrain where access by ground vehicles is difficult or undesirable.

More specifically, it is an object of this invention to provide an air-positionable work scaffold for utility poles.

It is another object of this invention to provide an air-positionable work scaffold having a landing platform to permit a worker to disembark from a hovering helicopter onto the landing platform.

In accordance with the above and other objects, the present invention provides a work scaffold for supporting one or more persons, a pair of hooks projecting from the upper portion of one face of the work scaffold for engaging the cross arms of a utility pole, a bumper mounted on the lower portion of the same face of the work scaffold for engaging the vertical column of the utility pole, and a landing platform mounted on the upper part of th work scaffold to permit a worker to disembark from a hovering helicopter. A suspension member mounted on the work scaffold and projecting upward from the landing platform permits the landing platform/work scaffold to be lifted and positioned by a helicopter.

It is also an object of this invention to provide a method and apparatus for maneuvering a helicopter-suspended work scaffold into position on top of a utility pole.

It is still another object of this invention to provide a method and apparatus for picking up a work scaffold from the top of a utility pole by a helicopter.

In accordance with the above and other objects, the present invention provides a first maneuvering pole which can be manipulated by a person on board the helicopter to adjust the angle between the helicopter and a work platform suspended from the helicopter. A second pole is attached to a lift hook which is suspended from the helicopter and enables a person on board the helicopter to maneuver the lift hook to engage or disengage the suspension member of the work scaffold. The lift hook is preferably provided with a latch and keeper to positively prevent the hook from becoming accidentally disengaged from the work scaffold. The keeper may be operated by a cable to release the latch when the work scaffold is properly positioned on top of the utility pole.

Other objects and advantages of the present invention will be apparent from the following detailed description and accompanying drawings which set forth, by way of example, the principle of the present invention and the best mode contemplated of carrying out that principle.

In the drawings:

FIG. 2 is a perspective view showing the landing platform and work scaffold of the present invention mounted on top of a utility pole with a helicopter in position to permit a person to disembark from the helicopter onto the landing platform;

FIG. 3 is a side view of the preferred form of lift hook according to the present invention; and FIG. 4 is a front view of the lift hook shown in FIG. 3.

Figure 1:
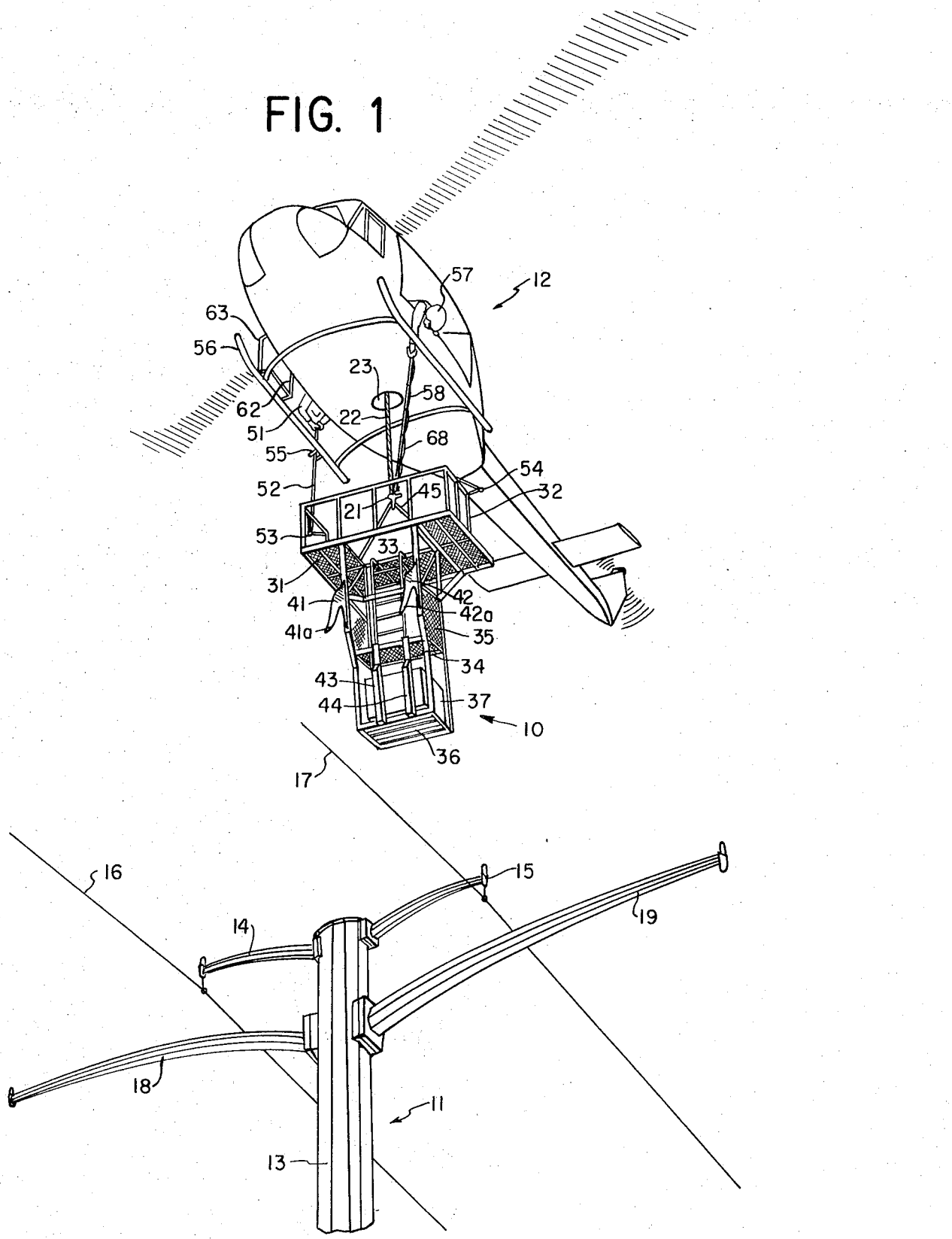
FIG. 1 is a perspective view showing the landing platform and work scaffold of the present invention suspended from a helicopter above the top of a utility pole.

Referring now to FIG. 1 of the drawings, there is shown a perspective view of the landing platform and work scaffold 10 of the present invention suspended above a utility pole 11 by a helicopter 12. The utility pole 11 may be of a conventional type having a vertical column 13, a pair of crossarms 14 and 15 for carrying static wires 16 and 17 respectively, and another pair of crossarms 18 and 19 for carrying power lines, not shown. Utility pole 11 may be made of wood, steel or other suitable conventional material.

Helicopter 12 may be of a conventional type such as, for example, the Bell Model 205A helicopter manufactured by the Bell Helicopter Co. of Fort Worth, Tex. A lift hook 21 is suspended by a cable 22 from the helicopter 12. The cable 22 may be attached to a winch, not shown, within the helicopter or may simply be a cable of fixed length attached to a suspension point 23 beneath the helicopter 12. The helicopter 12 preferably has doors on both sides in order to permit the maneuvering of the landing platform and work scaffold 10 by two crewmen during positioning and removal of the landing platform and work scaffold 10 from the top of the utility pole 11 as will be explained in greater detail hereinbelow.

The landing platform and work scaffold 10 is designed and constructed to safely and securely support one or more workers and their equipment. In the preferred form shown in FIG. 1, the lower portion of the landing platform and work scaffold 10 is made of steel while the upper portion, including the landing platform, is made of aluminum in order to keep the center of gravity as low as possible.

The construction technique may be conventional including a framework made of steel or aluminum members, preferably welded together, and expanded-metal decks and sidewalls. It will be appreciated, however, that other construction materials and techniques may be employed within the spirit and scope of the present invention. For example, the landing platform and work scaffold 10 may be made of fiberglass or other suitable material, particularly if electrical insulating properties are desired.

The preferred form of landing platform and work scaffold 10 shown in FIG. 1 includes a landing platform 31 which is of a size to permit a workman to safely disembark from a hovering helicopter. For example, the landing platform 31 may be about 8 feet wide and about 6 feet deep. A guardrail 32 extends around the front and about halfway back the sides of the landing platform 31 is open to permit the helicopter 12 to move into the position shown in FIG. 2 to allow the workmen to disembark.

A ladder 33 provides access to a work platform 34 mounted below the landing platform 31. Expanded-metal walls 35 are provided at the sides and rear of the work platform 34 for safety purposes. An equipment rack 36 is mounted below the work platform 34 to carry whatever heavy equipment may be required for a particular job. For example, the equipment rack 36 may carry an electrical generator 37 to provide power for welding operations.

A pair of hooks 41 and 42 extend from the upper portion of the front face of the landing platform and work scaffold 10. Hooks 41 and 42 are designed to engage the crossarms 14 and 15 of the utility pole 11 to securely support the landing deck and work scaffold 10 while the workmen are performing required work on the pole or lines.

The points 41a and 42a of hooks 41 and 42 are spaced about 3 feet from the front face of work scaffold 10 in order to readily capture crossarms 14 and 15 as scaffold 10 is lowered into position. The outer portion hooks 41 and 42 are curved outward to facilitate capture, and the inner portions are curved inward to securely engage the crossarms 14 and 15 when the work scaffold 10 is in position. Hooks 41 and 42 are sufficiently widely spaced to accommodate a variety of utility poles.

A pair of bumpers 43 and 44, preferably made of rubber or other suitable resilient material, are mounted on the lower portion of the front face of landing platform and work scaffold 10. Bumpers 43 and 44 engage the vertical column 13 of utility pole 11 in order to stabilize landing platform and work scaffold 10 when it is in place on the pole 11.

A suspension member 45 is mounted on the work scaffold 10 and projects upward from the landing platform 31 to provide purchase for the lift hook 21. The suspension member 45 is preferably of triangular configuration as shown in FIGS. 1 and 2 so as to provide a large target for the lift hook 21 when the helicopter 12 approaches to remove the landing platform and work scaffold 10 from the pole 11 and yet provide a precise point of suspension at the apex 46 of suspension member 45 so as to precisely control the attitude of the landing platform and work scaffold 10 when suspended form the lift hook 21. More particulary, apex 46 of suspension member 45 is located so that where suspended the lower portion of work scaffold 10 hangs slightly to the rear of the upper portion, for example about five to ten degrees from the vertical, so that when the suspended work scaffold 10 is lowered onto the pole 11, the lower portion of work scaffold 10 including bumpers 43 and 44 do not interfere with the pole 11 before the hooks 41 and 42 engage the crossarms 14 and 15.

Positioning the landing platform and work scaffold

Referring again to FIG. 1 of the drawings, the helicopter 12 is shown in position to lower the landing platform and work scaffold 10 into position on the utility pole 11. The positioning of the landing platform and work scaffold 10 is assisted by a crewman 51 who leans out of the side of the helicopter 12 and manipulates a pole 52 which engages a guide ring 53 mounted on the work scaffold 10. In the preferred embodiment, the guide ring 53 is mounted on the guardrail 32 of the landing platform 31. A second guide ring 54 is mounted on the other side of the guardrail 32 for convenience. A bracket 55 is mounted on the skid 56 of helicopter 12 to provide a fulcrum for the pole 52 so that the crewman 51 can more readily control the orientation of the landing platform and work scaffold 10 with respect to the helicopter 12. The positioning of the landing platform and work scaffold 10 onto pole 11 is accomplished by causing the helicopter 12 to descend while the crewman 51 controls the orientation of the landing platform and work scaffold 10. Care must be taken to lower the work scaffold 10 between the static wires 16 and 17 and to make sure that both of the hooks 41 and 42 respectively engage the crossarms 14 and 15.

After the landing platform and work scaffold 10 is in position on the pole 11, the lift hook 21 is released from the suspension member 45 by a second crew member 57 who pulls a cable to retract the keeper and thus release the latch of lift hook 21 so that he can remove hook 21 from suspension member 45 by manipulating pole 58.

After the lift hook 21 is released from suspension member 45, the helicopter 12 is free to maneuver to permit one or more workmen to disembark onto the landing platform 31. More specifically, referring to FIG. 2 of the drawings, it will be seen that the helicopter 12 is maneuvered so that its skid 56 rests on the landing platform 31. One or more workmen may then disembark from the door 61 of helicopter 12 onto the landing platform 31. A pair of handrails 62, 63 may be mounted on the helicopter skid 56 in order to provide greater safety for the workmen as they disembark from the helicopter 12 onto the landing platform and work scaffold 10. It will be appreciated that the construction of landing platform and work scaffold 10 places the landing platform 31 sufficiently high above the top of pole 11 that there is little danger that the helicopter 12 will run afoul of static wires 16 and 17 when it is maneuvering to permit the work crew to disembark.

After the workmen are on board the landing platform and work scaffold 10, the helicopter 12 flies away until they have completed their job. When the job is completed, the helicopter returns to the position shown in FIG. 2 to allow the workmen to board the helicopter 12 from the landing platform 31. The helicopter then maneuvers to pick up the landing platform and work scaffold 10 and move it to the next pole where work needs to be done.

Picking up the landing platform and work scaffold

The picking up of the landing platform and work scaffold 10 from the pole 11 is accomplished by the helicopter pilot with the assistance of the crewman 57. The helicopter pilot maneuvers the helicopter 12 until the lift hook 21 is near the suspension member 45. The crewman 57 then uses pole 58 which is attached to the lift hook 21 to maneuver the lift hook 21 into engagement with the suspension member 45. The helicopter 12 can then lift the landing platform and work scaffold 10 from the pole 11 and transport it to the next pole where work needs to be done.

The lift hook

FIGS. 3 and 4 show detailed views of the lift hook 21 used in the preferred form of the present invention. The lift hook 21 is preferably made of steel or other suitable material and is attached by a shackle 65 to the cable 22 (shown in FIG. 1). The lift hook 21 is provided with a latch 66 which is retained in the closed position by a keeper 67 as shown in FIG. 3. The latch 66 and keeper 67 serve to retain the suspension member 45 in engagement with hook 21 when lift is not being exerted by the helicopter.

The keeper 67 is springloaded to the position shown in FIG. 3 but may be retracted by a cable 68 which is operated by the crewman 57 shown in FIG. 1. When the keeper 67 is retracted to position 67a shown in dashed lines in FIG. 3, spring 64 shown in FIG. 4 causes the latch 66 to spring to the position 66a shown in dashed lines from which II can swing to the fully open position 66 thus allowing the hook 21 to be disengaged from the suspension bar 45. The pole 58 is pivotally mounted to a member 69 welded to the hook 21 to permit the crew member 57 shown in FIG. 1 to maneuver the hook 21 by manipulating the pole 58.

When the hook 21 is about to be used to pick up the work scaffold 10, the latch 66 is in position 66a where it serves to retain keeper 67 in position 67a. When hook 21 is snapped onto the suspension member 45, suspension member 45 passes through the springloaded latch 66 and keeper 67 as through a trap resetting them to the closed condition shown in FIG. 3. The work scaffold 10 can then be lifted from pole 11 without danger of hook 21 becoming disengaged from suspension member 45.

Although the subject landing platform and work scaffold has been described in connection with utility pole maintenance it will be appreciated that the principle of the present invention may be applied to use with other types of supporting structures such as, for example, radio towers, where speedy access by work crews and equipment is otherwise difficult or impractical.

It will be appreciated further that various modifications and adaptations of the subject landing platform and work scaffold may be made without departing from the spirit and scope of the invention as set forth with particularity in the appended claims.

What is claimed is:

1. A landing platform and work scaffold adapted to be positioned on a pole structure by a helicopter or the like comprising:
    a scaffold for supporting one or more persons;
    means mounted on said scaffold enabling said scaffold to be suspended from a helicopter;
    means mounted on said scaffold for engaging a pole structure to support said scaffold at the top of the pole structure when said scaffold is lowered onto the pole structure; and
    a landing platform mounted on top of said scaffold in a position to provide clearance between the top of the pole structure and the rotor of a hovering helicopter touching said landing platform, said landing platform being of a size to permit one or more persons to step directly from the cabin of a hovering helicopter onto said landing platform when said scaffold is supported at the top of the pole structure.

2. The landing platform and work scaffold of claim 1 wherein said means for engaging said pole structure comprises:
    a pair of hooks projecting from the upper portion of a side of said scaffold for engaging the pole structure.

3. The landing platform and work scaffold of claim 2 wherein said means for engaging said pole structure further comprises:
    a resilient bumper mounted on the lower portion of said side of said scaffold for engaging the pole structure.

4. The landing platform and work scaffold of claim 2 wherein said hooks are mounted above the center of gravity of said landing platform and work scaffold.

5. The landing platform and work scaffold of claim 4 wherein said bumper is mounted below the center of gravity of said landing platform and work scaffold.

6. The landing platform and work scaffold of claim 5 wherein said means enabling said scaffold to be suspended from a helicopter comprises an elongated suspension member mounted on said scaffold and extending upward from said landing platform in the form of a triangle having its apex upward so that, when said suspension member is engaged by a lifting hook attached to a helicopter, the hook will move to said apex of said suspension member.

7. The landing platform and work scaffold of claim 6, wherein said apex of said suspension member is located so that when said landing deck and work scaffold is suspended by said suspension member, said bumper will hang to the rear of said hooks to prevent said bumper from interfering with said pole structure before said hooks engage said pole structure.

8. The landing platform and work scaffold of claim 7, wherein said landing platform and the upper portion of said scaffold are made of lighter-than-steel material and the lower portion of said scaffold is made of steel in order to provide a low center of gravity for said landing platform and work scaffold.

9. The landing platform and work scaffold of claim 1, further comprising a guardrail partially surrounding said landing platform, one side of said landing platform being open to permit a person to disembark onto it from a hovering helicopter.

10. A work scaffold for a utility pole having a vertical column and a pair of arms extending substantially horizontally from said column, said work scaffold comprising:
    a scaffold structure having a substantially vertical face and at least one horizontal work platform;
    a pair of hooks mounted on the top portion of said face of said scaffold structure for engaging the horizontal arms of the utility pole;
    a bumper mounted on the lower portion of said face of said scaffold structure for engaging the vertical column of the utility pole;
    a landing platform mounted on top of said scaffold structure to permit a person to disembark from a hovering helicopter onto said landing platform; and a suspension member projecting upward from said landing deck to permit said scaffold structure to be lifted from the utility pole by a helicopter.

11. The work scaffold of claim 10, further comprising a guide ring mounted on said scaffold structure, said guide ring being adapted to receive the end of a maneuvering pole manipulated by a person in the helicopter whereby said work scaffold may be more readily positioned on a utility pole.

* * * * *